US008703261B2

(12) United States Patent
Lien

(10) Patent No.: US 8,703,261 B2
(45) Date of Patent: Apr. 22, 2014

(54) PHOTOLUMINESCENT SLEEVE

(75) Inventor: Jeffrey R Lien, Clayton, WI (US)

(73) Assignee: Litrovision, LLC, Clayton, WI (US)

( * ) Notice: Subject to any disclaimer, the term of this patent is extended or adjusted under 35 U.S.C. 154(b) by 130 days.

(21) Appl. No.: 13/515,048

(22) PCT Filed: Dec. 29, 2009

(86) PCT No.: PCT/US2009/069702

§ 371 (c)(1), (2), (4) Date: Jun. 11, 2012

(87) PCT Pub. No.: WO2010/078339

PCT Pub. Date: Jul. 8, 2010

(65) Prior Publication Data

US 2012/0276800 A1 Nov. 1, 2012

Related U.S. Application Data

(60) Provisional application No. 61/203,832, filed on Dec. 30, 2008.

(51) Int. Cl.

*B29C 47/00* (2006.01)
*B29D 22/00* (2006.01)
*B29D 23/00* (2006.01)
*B32B 1/08* (2006.01)

(52) U.S. Cl.

USPC .............................. 428/36.9; 445/23; 138/106

(58) Field of Classification Search

USPC .............................. 428/36.9; 445/23; 138/106

See application file for complete search history.

(56) References Cited

U.S. PATENT DOCUMENTS

| | | | |
|---|---|---|---|
| 6,364,498 | B1 | 4/2002 | Burbank |
| 6,479,936 | B1 | 11/2002 | Martinez |
| 2005/0110387 | A1 | 5/2005 | Landry |
| 2005/0148717 | A1 | 7/2005 | Smith et al. |
| 2005/0264159 | A1 | 12/2005 | Foo |

*Primary Examiner* — Michael C Miggins

(74) *Attorney, Agent, or Firm* — Dicke, Billig & Czaja, PLLC

(57) ABSTRACT

An elongate tube formed from a composite material comprising a polymer and a photoluminescent material has a cylindrical wall that defines an arc of between about 180 degrees and 360 degrees or greater. An elongate opening is defined in the wall along the length of the tube. The wall of the tube is flexible which permits the opening to be manually enlarged to enable the tube to be mounted over an electric light source. The wall is configured to approximate the outer dimensions of the light source which retains the tube on the light source. The photoluminescent material in the tube wall is energized by the light source and emits sufficient light for a period of time if the electricity to the light source is temporarily interrupted.

31 Claims, 4 Drawing Sheets

PHOTOLUMINESCENT SLEEVE

CROSS-REFERENCE TO RELATED APPLICATION(S)

This application claims priority to provisional patent application Ser. No. 61/203,832, filed Dec. 30, 2008, and is the national phase of PCT/US2009/069702, filed Dec. 29, 2009.

BACKGROUND

The present invention is directed generally to safety lighting, and in particular to a photoluminescent sleeve device for use with a light source. Buildings typically rely on electricity to operate lighting systems during low ambient light conditions. In the event of an interruption of electricity to such lighting systems, it would be advantageous to equip the lighting system with a reliable, easy-to-install back-up lighting source that can function in the absence of electricity.

SUMMARY

A photoluminescent sleeve comprises a cylindrical tube. The tube has a length and a cylindrical wall that extends the length of the tube. The wall is configured to define an arc of about 360 degrees or less. The wall is configured with an opening that extends the length of the tube. The wall comprises a polymer material and a phosphorescent material.

DETAILED DESCRIPTION

The predominant if not exclusive lighting systems used in commercial buildings, such as office buildings, manufacturing facilities, work facilities, hospitals, etc., are fluorescent lighting systems. A common fluorescent lighting system is comprised of a fixture, typically white in color, having one or more elongate, cylindrical fluorescent light bulbs. By way of example, the photolumiscent sleeve of the present invention will be described for use with such cylindrical fluorescent light bulbs. It is to be understood, however, that the photoluminescent sleeve of the present invention is not limited solely to uses with fluorescent light bulbs, but may be adapted for use with any variety of lighting sources.

Figure 1:
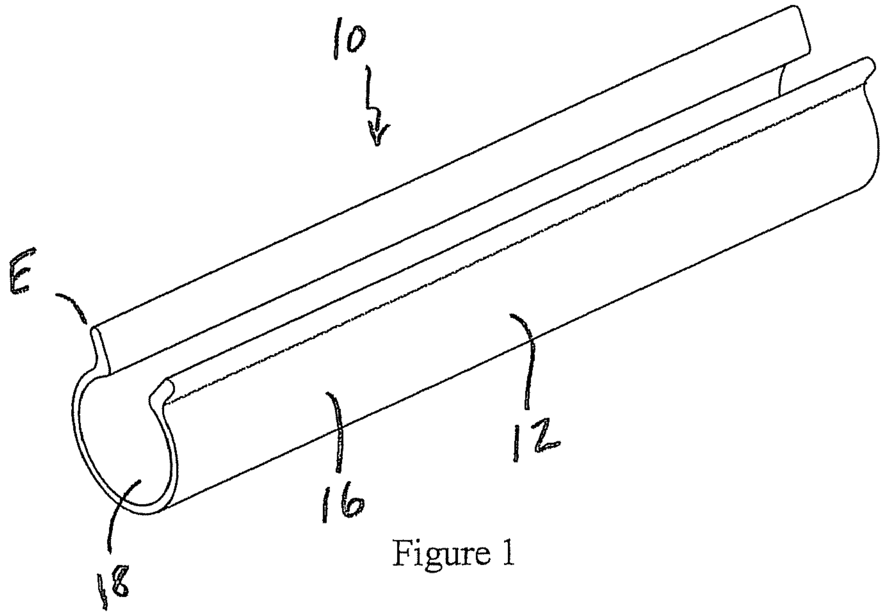
FIG. 1 is a perspective view of one embodiment of a photoluminescent sleeve of the present invention.
Figure 2:
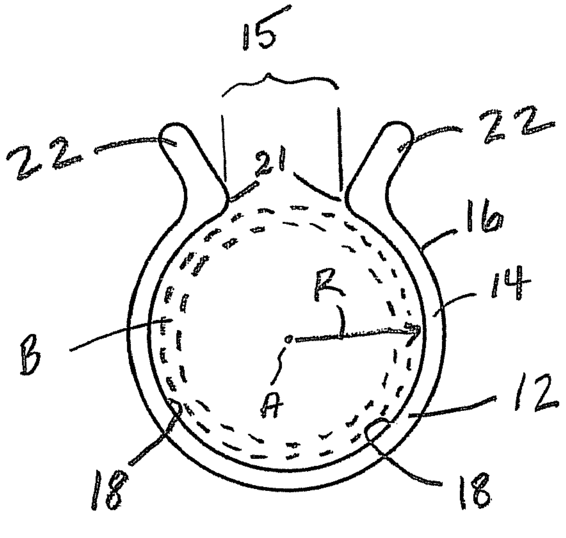
FIG. 2 is an end view of the photoluminescent sleeve of FIG. 1.

FIG. 1 is a perspective view of a first embodiment of a photoluminescent sleeve 10. FIG. 2 is and end view of sleeve 10. Referring to FIGS. 1 and 2, in one embodiment, sleeve 10 is comprised of an elongate hemi-cylindrical tube 12 having a hemi-cylindrical wall 14 defined by an arc of less than 360 degrees. As used herein, hemi-cylindrical or cylindrical shall be taken to be inclusive of a variety of tubular cross-sectional shapes other than circular, such as square, octagonal, etc. In one embodiment, wall 14 is defined by an arc of greater than 180 degrees and less than 360 degrees such that sleeve 10 includes an elongate opening 15. In one exemplary embodiment, wall 14 includes an outer surface 16 and a concentric inner surface 18 which defines a wall thickness of wall 14. The inner surface 18 defines a static radius R relative to a longitudinal axis A of sleeve 10. The dimension of radius R is selected according to the dimension of the outer diameter and radius of a fluorescent light bulb B with which sleeve 10 is intended to be used. Radius R will generally approximate the radius of the outer surface of the fluorescent light bulb B.

In one embodiment, tube 12 is formed from a phosphorescent compound comprising a flexible, heat-resistant polymer that is impregnated with a phosphorescent material. An example of a suitable polymer is a Georgia Pacific grade 9209 polyvinyl chloride (PVC). Suitable phosphorescent material may include readily commercially available phosphor compounds such as alkaline earth metal sulphides and alkaline earth metal silicate oxides, including zinc sulphide and strontium aluminate. Strontium aluminate is energized by visible and ultraviolet light and is able to emit light for an extended period after removal of a light source. In one embodiment, the phosphorescent material comprises 15 percent by weight of the phosphorescent compound. In one embodiment, sleeve 10 is formed from the phosphorescent compound by an extrusion process, which enables sleeve 10 to be made of a variety of lengths according to the length of fluorescent light bulb with which sleeve 10 is to be used. Sleeve 10 may comprise a length generally equal to the length of the light bulb, or sleeve 10 may comprise a length less than the length of the light bulb. Wall 14 of sleeve 10 has a thickness selected to allow sleeve 10 to flex in a radial direction such that the Radius R and hence opening 15 can be temporarily increased to permit sleeve 10 to be installed over a fluorescent light bulb. In one embodiment, the thickness of wall 14 is selected to be between about 0.100 inches and 0.200 inches.

Sleeve 10 is installed over a fluorescent light bulb by manually expanding the wall 14 at one end E of sleeve 10 until opening 15 is slightly larger than the diameter of the fluorescent light bulb. Opening 15 at end E is placed over the light bulb, at which point the remaining sleeve extends at an angle relative to the light bulb. Starting at end E and gradually moving along the length of sleeve 10, pressure is applied to outer surface 16 to cause wall 14 to flex and opening 15 to expand to move over the light bulb. Each free end 20 of wall 14 along opening 15 includes a radiused edge 21 which facilitates movement of sleeve 10 over the fluorescent light bulb. Due to the flexible characteristic of the phosphorescent compound, wall 14 will return to the static radius R once the opening 15 moves past the diameter of the fluorescent light bulb and the inner surface 18 fully engages the outer surface of the light bulb. In this manner, sleeve 10 will be retained on light bulb B. The dimension of opening 15 will vary according to the arc of wall 14 selected for sleeve 10, with the greatest opening occurring when the arc of wall 14 approaches 180 degrees. In the event light bulb B has to be replaced, sleeve 10 can be removed by reverse operation. The wall 14 of sleeve 10 is manually expanded at one end E of sleeve 10 to enable the opening 15 to move past the outer diameter of light bulb B. A continued downward force is applied to end E which causes wall 14 to expand in radius thereby allowing ends 20 of wall 14 to move past the outer diameter of light bulb B until sleeve 10 has completely separated from the light bulb.

A phosphorescent sleeve having the aforementioned characteristics and dimensions permits sleeve 10 to be installed over a fluorescent light bulb without having to remove the light bulb and further will allow some light from the fluorescent light bulb to be emitted toward the base of the lighting system fixture in the region of opening 15, where it is reflected toward the area surrounding the light fixture. The remaining wall of sleeve 10 absorbs light energy in the phosphorescent material. In the event of an interruption of power to the lighting system, the phosphorescent sleeve 10 is able to deliver ample lighting to allow sighted occupants in the vicinity to maneuver through the building. In one embodiment, sleeve 10 is mounted on a plurality of light bulbs throughout a building to provide back-up lighting in the event of an interruption of power to the lighting system. Each sleeve 10 may have a length less than the length of a fluorescent light bulb so as to cover only a portion of the light bulb. Several sleeves 10 may be installed on a single light bulb in a pattern such that each sleeve 10 is spaced from one another.

In one alternate embodiment, wall 14 defines an arc of about 360 degrees or greater, in which case wall ends 20 overlap one another, but are otherwise separable to create the opening 15 and allow sleeve 10 to be installed over a light bulb as described above.

As further shown in FIGS. 1 and 2, in one embodiment a tab 22 is provided along each free end 20 of wall 12. In one embodiment, tab 22 is integrally attached to the free end 20 of wall 12 during the extrusion process. By way of example, tab 22 may have a length of about 0.25 inches. Each tab 22 extends at an angle relative to wall 14, e.g., at about a 90 degree angle. Tabs 22 facilitate manual manipulation of the radius R of wall 14 for installation and removal of sleeve 10 relative to light bulb B.

Figure 3:
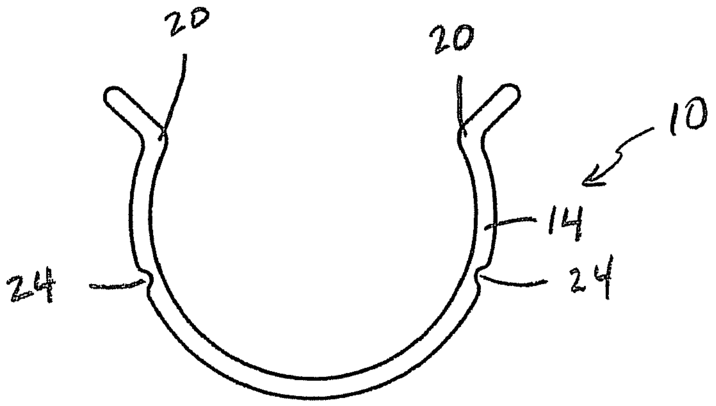
FIG. 3 is an end view of a first alternate embodiment of a photoluminescent sleeve of the present invention.

FIG. 3 is an end view of a first alternate embodiment of phosphorescent sleeve 10. According to the first alternate embodiment, wall 14 of sleeve 10 includes one or more hinges 24 radially spaced from ends 20. Each hinge 24 is formed by creating a localized reduction in the wall thickness during the extrusion process. Hinge 24 decreases the amount of force necessary to move apart ends 20 of wall 14 for installation and removal of sleeve 10 relative to light bulb B. As a consequence, the compressive force of ends 20 of wall 14 on the outer surface of light bulb B are reduced, thus minimizing the risk of damage to the light bulb during installation and removal of sleeve 10. In one embodiment, the wall thickness of wall 14 at the location of hinge 24 is from 1 percent to 50 percent of the remaining portion of wall 14. While two hinges 24 are shown in FIG. 3, it is to be understood that a single hinge or multiple hinges may be employed to achieve the beneficial effect of a hinged wall as described above.

Figure 4:
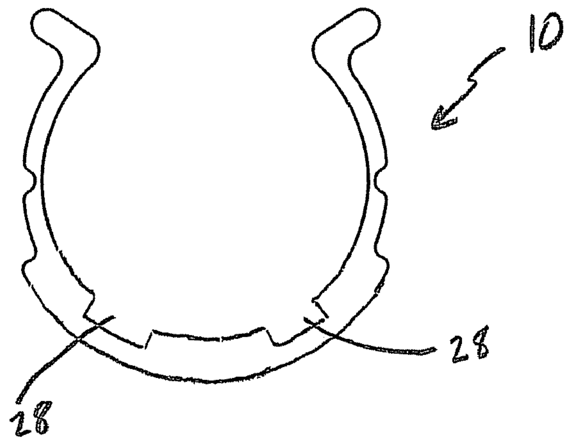
FIG. 4 is an end view of a second alternate embodiment of a photoluminescent sleeve of the present invention.

FIG. 4 is an end view of a second alternate embodiment of photoluminescent sleeve 10. As shown in FIG. 4, a portion 26 of wall 14 opposite opening 15 includes a greater wall thickness along the length of sleeve 10. In a non-limiting example, the portion of increased wall thickness 26 extends generally from the 4 o'clock position to the 8 o'clock position, as viewed in FIG. 4, which generally corresponds to the area of sleeve 10 that is directly visible to occupants. By increasing the wall thickness, the amount of phosphorescent material available to emit light is increased in the event power to the fluorescent light bulb is lost. Hence, the light emitting performance of sleeve 10 is enhanced. To compensate for any decrease in the flexibility of wall 14 due to the increased wall thickness of portion 26, one or more grooves 28 may be included along the length of sleeve 10 in the inner surface 18 of wall 14 in the vicinity of portion 26. Portion 26 and grooves 28 are formed in the extrusion process.

Figure 5:
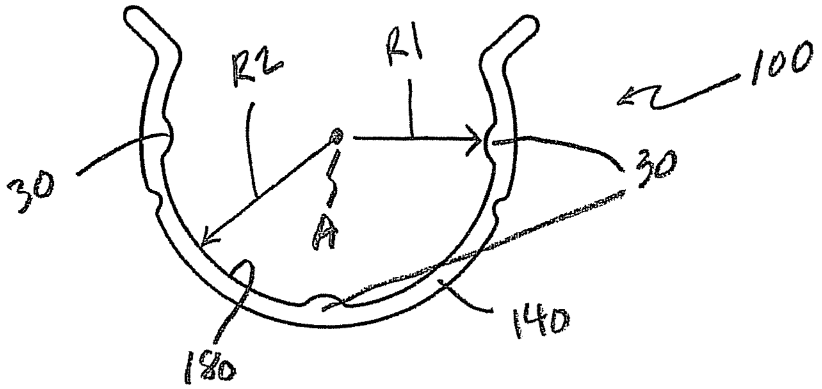
FIG. 5 is an end view of a third alternate embodiment of a photoluminescent sleeve of the present invention.
Figure 6:
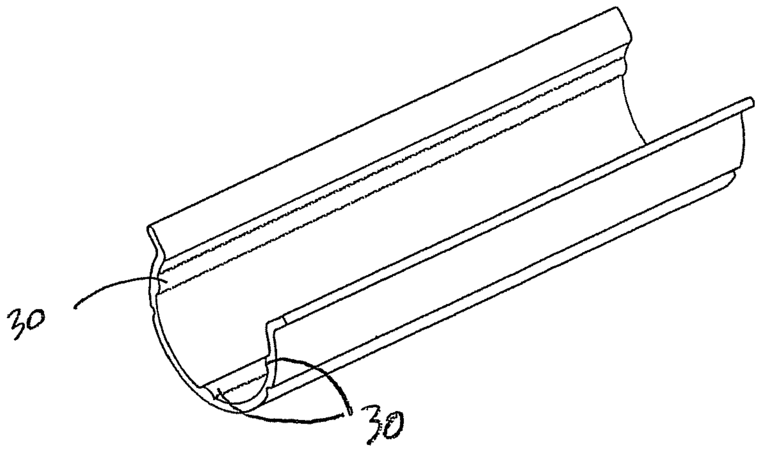
FIG. 6 is a perspective view of the photoluminescent sleeve of FIG. 5.

FIGS. 5 and 6 show an end view and a perspective view, respectively, of a third alternate embodiment of sleeve 100. According to this third alternate embodiment, a plurality of ribs 30 are generally equally radially spaced and integrally formed with the inner surface 180 of sleeve 100 along the length of sleeve 100. Each rib 30 defines a radius R1, which generally approximates the radius R of the first embodiment of sleeve 10 shown in FIGS. 1 and 2. As such, the inner surface 180 of sleeve 100 defines a radius R2 which is greater than the radius R1. Thus, when sleeve 100 is installed on a fluorescent light bulb, sleeve 100 contacts the outer surface of the light bulb only along ribs 30. Because radius R2 is greater than the radius R1, an air space between wall 140 and the light bulb is formed which aids in reducing heat transfer from the light bulb to sleeve 100.

Figure 7:
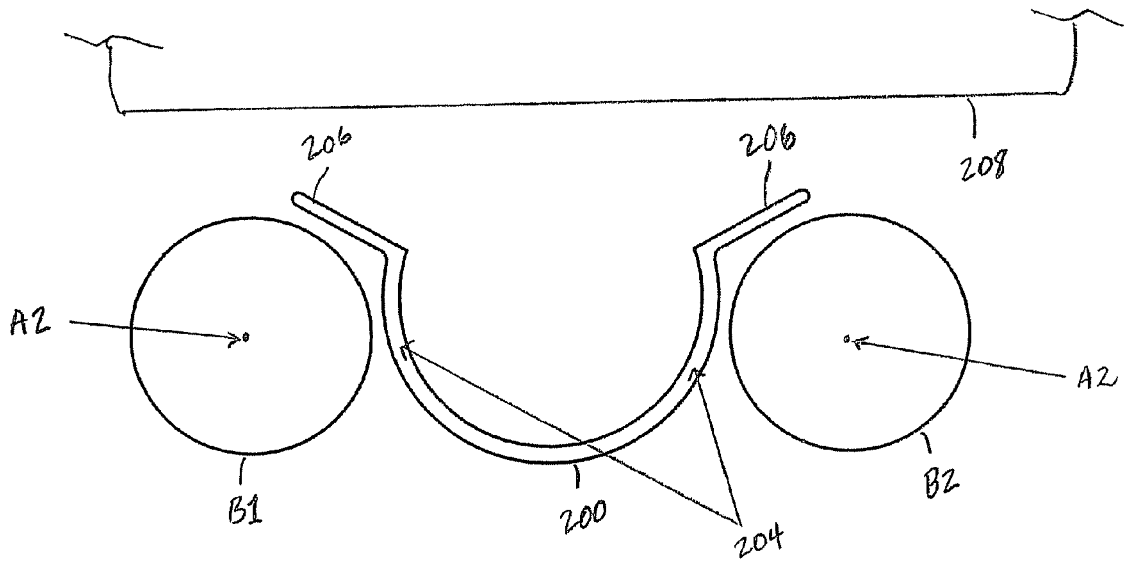
FIG. 7 is an end diagrammatic view of a fourth alternate embodiment of a photoluminescent sleeve of the present invention.

FIG. 7 is a diagrammatic end view of a fourth embodiment of a photoluminescent sleeve 200 for use in a lighting system having side-by-side fluorescent light bulbs B1 and B2. As shown in FIG. 7, photoluminescent sleeve 200 comprises a generally U-shaped channel 202 having a pair of legs 204 and a tab 206 integrally formed at the free end of each leg 204. Each tab 206 extends from the respective legs 204 at an angle of, for example, about 135 degrees. U-shaped channel 202 and tabs 206 are formed in an extrusion process similar to sleeve 10 (FIGS. 1 and 2). The legs 204 define a width W that is slightly greater than the distance between bulbs B1 and B2. The length of each leg 204 is selected to be such that the intersection of tab 206 and the free end of each leg 204 is located above the longitudinal axis A1 and A2, respectively of bulb B1 and B2. Because the width W of legs 204 is slightly greater than the distance between bulb B1 and B2, legs 204 of sleeve 200 can be manually compressed to position sleeve 200 between bulbs B1 and B2. When sleeve 200 is positioned between bulbs B1 and B2 with the intersection of tab 206 and the free end of each leg 204 located generally above axes A1 and A2, legs 204 are allowed to return towards an uncompressed position. As such legs 204 and tabs 206 are gently urged toward the outer surfaces of bulbs B1 and B2, which retains sleeve 200 in position between the two bulbs. Sleeve 200 permits bulbs B1 and B2 to radiate light towards the light fixture base 208 as well as in all directions away from sleeve 200, to illuminate the surrounding area of the light fixture. Light emitted toward sleeve 200 will energize the photoluminescent material in imbedded in the wall of the sleeve for subsequent lighting of the surrounding area if electricity to the light bulbs is unexpectedly interrupted. It is to be appreciated that other configurations other than a U-shaped channel, such as sleeve 10 shown in FIGS. 1 and 2, will function in substantially the same manner to engage a pair of spaced fluorescent light bulbs in the manner described above.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A photoluminescent sleeve comprising:

a tube having a length and a cylindrical wall extending the length of the tube, the wall configured to define an arc of about 360 degrees or less and a wall opening that extends the length of the tube, the wall comprising a polymer material and a phosphorescent material.

2. The photoluminescent sleeve of claim 1 wherein the wall is configured to define an arc of greater than 180 degrees.

3. The photoluminescent sleeve of claim 1 wherein the wall is configured to define an arc of greater than about 360 degrees.

4. The photoluminescent sleeve of claim 1 wherein the wall comprises a longitudinal edge along opposite sides of the opening, each longitudinal edge connected to a tab that extends at an angle relative to the wall.

5. The photoluminescent sleeve of claim 4 wherein the tab extends at an angle of about 90 degrees relative to the wall.

6. The photoluminescent sleeve of claim 4 wherein the tab has a length of about 0.25 inches.

7. The photoluminescent sleeve of claim 4 wherein the wall comprises an outer surface and an inner surface, the outer and inner surfaces defining a first wall thickness of the wall, wherein the first wall thickness is between about0.100 and 0.200 inches.

8. The photoluminescent sleeve of claim 7 wherein the sleeve has a longitudinal axis and wherein the wall has a first static radius relative to the longitudinal axis, the opening having a first dimension that is a function of the first static radius, the wall able to flex to define a second radius greater than the first static radius, the opening dimension having a second dimension greater than the first dimension, the second dimension being a function of the second radius.

9. The photoluminescent sleeve of claim 8 wherein the wall is configured to define at least one localized area of a second wall thickness, the second wall thickness being between about 1 percent to about 50 percent of the first wall thickness.

10. The photoluminescent sleeve of claim 9 wherein the wall is configured to define a first and a second localized area of the second wall thickness, the first and second localized areas being radially spaced from the longitudinal edges of the wall.

11. The photoluminescent sleeve of claim 7 wherein the wall comprises an area of a third wall thickness, the third wall thickness being greater than the first wall thickness.

12. The photoluminescent sleeve of claim 11 wherein the area of the third wall thickness comprises one or more longitudinal grooves in the inner surface of the wall.

13. The photoluminescent sleeve of claim 7 wherein the inner surface of the wall comprises a plurality of longitudinally extending ribs connected to the innersurface, the ribs defining a first radius of the sleeve, and the inner surface of the wall defining a second radius greater than the first radius.

14. A photoluminescent sleeve for use with a generally cylindrical light source, the sleeve comprising:

a generally cylindrical tube having a length and a generally cylindrical wall extending the length of the tube, the wall configured to define an arc of about 360 degrees or less and a wall opening that extends the length of the tube, the wall having a first radius approximating the radius of the light source, the wall capable of having a second radius greater than the first radius to enlarge the wall opening to position the tube over the light source along the length of the tube, the wall comprising a polymer material and a phosphorescent material.

15. The photoluminescent sleeve of claim 14 wherein the wall is configured to define an arc of greater than 180 degrees.

16. The photoluminescent sleeve of claim 14 wherein the wall is configured to define an arc of greater than about 360 degrees.

17. The photoluminescent sleeve of claim 14 wherein the inner surface of the wall comprises a plurality of longitudinally extending ribs connected to the inner surface, the ribs defining the first radius of the wall, and the inner surface of the wall defining a second radius greater than the first radius.

18. The photoluminescent sleeve of claim 14 wherein the tube has a length less than a length of the light source.

19. The photoluminescent sleeve of claim 14 wherein the tube has a length generally equal to a length of the light source.

20. The photoluminescent sleeve of claim 14 wherein the wall comprises a longitudinal edge along opposite sides of the opening, each longitudinal edge connected to a tab that extends at an angle relative to the wall.

21. The photoluminescent sleeve of claim 20 wherein the tab extends at an angle of between about 90 degrees to about 135 degrees relative to the wall.

22. The photoluminescent sleeve of claim 20 wherein the tab has a length of about 0.25 inches.

23. The photoluminescent sleeve of claim 20 wherein the wall comprises an outer surface and an inner surface, the outer and inner surfaces defining a first wall thickness of the wall, wherein the first wall thickness is between about 0.100 and 0.200 inches.

24. The photoluminescent sleeve of claim 23 wherein the wall is configured to define at least one localized area of a second wall thickness, the second wall thickness being between about 1 percent to about 50 percent of the first wall thickness.

25. The photoluminescent sleeve of claim 24 wherein the wall is configured to define a first and a second localized area of the second wall thickness, the first and second localized areas being radially spaced from the longitudinal edges of the wall.

26. The photoluminescent sleeve of claim 23 wherein the wall comprises an area of a third wall thickness, the third wall thickness being greater than the first wall thickness.

27. The photoluminescent sleeve of claim 26 wherein the area of the third wall thickness comprises one or more longitudinal grooves in the inner surface of the wall.

28. A method of providing emergency lighting to a space equipped with an electric lighting system, the electric lighting system comprising a plurality of light fixtures each having at least one generally cylindrical light source, the method comprising:

providing a generally cylindrical tube having a length and a generally cylindrical wall extending the length of the tube, the wall configured to define an arc of about 360 degrees or less and a wall opening that extends the length of the tube, the wall having a first radius approximating the radius of the light source, the wall capable of having a second radius greater than the first radius, the wall comprising a polymer material and a phosphorescent material;

enlarging the wall to the second radius to enlarge the wall opening;

positioning the wall opening over the light source along the length of the tube; and allowing the wall to return to the first radius so as to engage the light source and retain the tube thereon.

29. The method of claim 28 wherein the step of providing comprises providing a generally cylindrical tube wherein the length of the tube is less than a length of the light source.

30. A method of providing emergency lighting to a space equipped with an electric lighting system, the electric lighting system comprising a plurality of light fixtures each having at least one generally cylindrical light source, the method comprising:

providing a generally cylindrical tube having a length and a generally cylindrical wall extending the length of the tube, the wall configured to define an arc of about 360 degrees or greater and a wall opening that extends the length of the tube, the wall having a first radius approximating the radius of the light source, the wall capable of having a second radius greater than the first radius so as to enlarge the opening to a size larger than a diameter of the light source, the wall comprising a polymer material and a phosphorescent material;

enlarging the wall to the second radius;

positioning opening of the wall over the light source along the length of the tube; and allowing the wall to return to the first radius so as to engage the light source and retain the tube thereon.

31. The method of claim 30 wherein the step of providing comprises providing a generally cylindrical tube wherein the length of the tube is less than a length of the light source.

* * * * *